United States Patent [19]
Schulz

[11] 3,796,450
[45] Mar. 12, 1974

[54] SECURITY CHAIN

[76] Inventor: Donald A. Schulz, 2402 N. 118th St., Milwaukee, Wis. 53226

[22] Filed: Dec. 4, 1972

[21] Appl. No.: 312,020

[52] U.S. Cl. .............................................. 292/264
[51] Int. Cl. .......................................... E05c 17/36
[58] Field of Search ....................... 70/93; 292/264

[56] References Cited
UNITED STATES PATENTS

| | | | |
|---|---|---|---|
| 2,087,755 | 7/1937 | Dayton | 292/264 |
| 2,867,468 | 1/1959 | Bugge | 292/264 |
| 3,126,220 | 3/1964 | Callegari | 292/264 |
| 3,275,364 | 9/1966 | Quinn | 292/264 |
| 3,705,504 | 12/1972 | Johnson | 70/93 |

*Primary Examiner*—Werner H. Schroeder
*Attorney, Agent, or Firm*—Wheeler, Morsell, House & Wheeler

[57] ABSTRACT

A door safety chain in which the slide track does not terminate at the end away from the edge of the door but re-enters the base, the slide track being notched to permit removal of the slide carrying the safety chain in a direction toward the door edge and at an angle to the track.

6 Claims, 6 Drawing Figures

PATENTED MAR 12 1974

PATENTED MAR 12 1974 3,796,450

SECURITY CHAIN

BACKGROUND OF THE INVENTION

The purpose of the invention is to provide additional safety against the activities of housebreakers. The traditional variety of safety chain slide track has a closed end nearest the door frame and terminates at a free end which is secured so that it is remote from the door edge. When the door is opened, the tension of the chain secured to the frame pulls the slide toward the closed end of the track, thereby preventing the removal of the safety chain slide from the free end of the track without first closing the door. A known technique of housebreakers to defeat this type of safety chain is to open the door and reach around the edge to attach a rubber band to the chain slide. The other end of the rubber band is attached to the door itself at a location well in from the end of the slide so that the rubber band is under tension. The housebreaker then recloses the door so that the tension of the rubber band pulls the slide off the end of the track as the closing door permits slack in the chain. The safety chain is then unfastened and the door may readily be reopened for entry.

The prior art track is exemplified by U.S. Pat. No. 2,003,473, which shows the commonest type of safety chain in use today. U.S. Pat. No. 2,426,826 shows a somewhat different type of safety chain which is intended to provide security against the type of removal discussed above, by means of a pivoted rail section which is gravity biased to occupy a position blocking the removal of the slide. However, a burglar could readily defeat this device by looping an additional rubber band around the free end of the slide to temporarily hold it in its slide removal position. U.S. Pat. No. 2,867,468 shows a vertically operating safety chain slide in which the track is a slot rather than a rail, the slot having an open section at the end for slide removal and a spring which in its normal position bars the movement of the slide along the slot toward removal. Although the device requires that the spring be depressed before the slide is moved upward to the point where removal may be effected, the vertical orientation would permit operation of the spring and of the chain carrying slide by a housebreaker with the door partially open.

SUMMARY OF THE INVENTION

My invention comprises a conventional jamb plate to which the security chain may be permanently fixed, and a conventional door anchorage plate carrying a slide track of unconventional form. The slide track may be either a rail or a slot. The security chain and the slide are conventional also. The slide track does not have a free end, but is angled to meet the base at both ends. A notch is provided in the track in the portion which is parallel to the door but meeting the portion which is angled inwardly to meet the base. The slot is shorter than that portion of the slide which lies behind the track to secure the slide to the track so that the slide may not simply be pulled outwardly from the track. In order to remove the slide from the track is is necessary to slide it past the notch onto the angled portion of the track and then return the slide toward the free edge of the door at an angle matching the angle of the end of the slide so that the edge of the slide passes through the notch. The means defining the track is desirably formed of very heavy metal, like the base, and is simply an offset portion of the base integral with the rest of the base but offset from its plane to form the track rather than being formed separately with a central horizontal partition joining it to the base as shown in U.S. Pat. No. 2,003,473. Thus both ends of the track are part of the base, thereby making it substantially impossible to pivot the free end of the track away from the base plate by applying excessive force to the door.

DRAWINGS

DESCRIPTION

Figure 1:
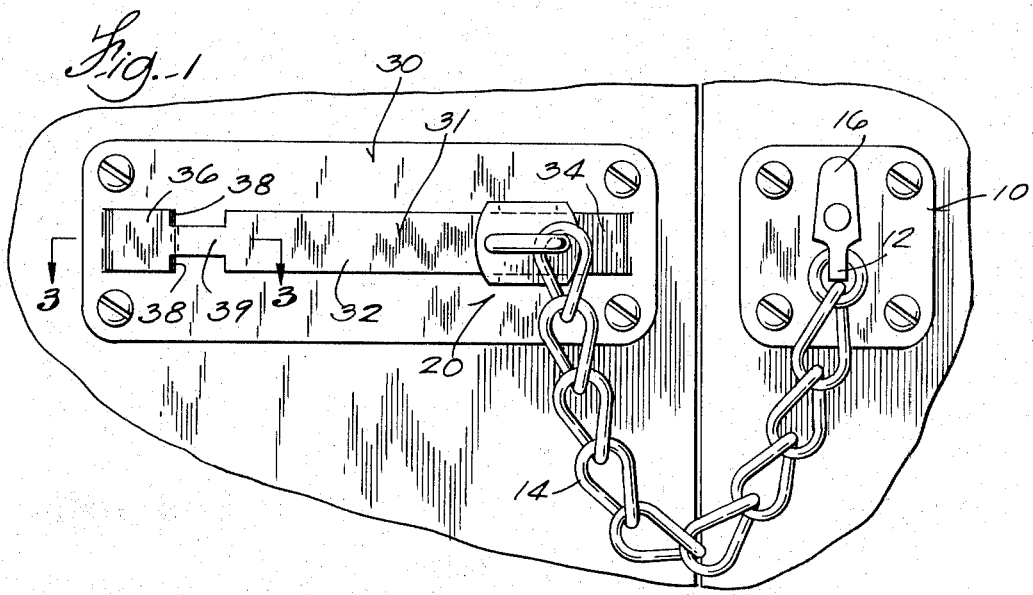
FIG. 1 is a front elevational view of a portion of a door and door jamb with one embodiment of my invention applied thereto.
Figure 2:
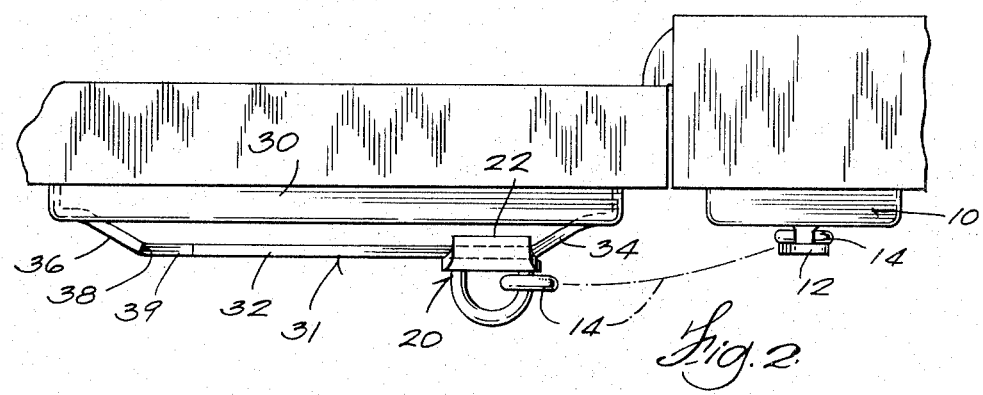
FIG. 2 is a top view of the embodiment shown in FIG. 1 applied to a door and door jamb.

My device includes a standard jamb plate 10 secured to the jamb in any conventional way, and including a secure anchorage 12 for a security chain 14. It may also desirably include a flange 16 for storing the slide 20 which is secured permanently to the outer end of security chain 14.

Slide 20 is provided with edge flanges 22 curved to engage the edges of the track for an easy sliding fit.

Figure 3:
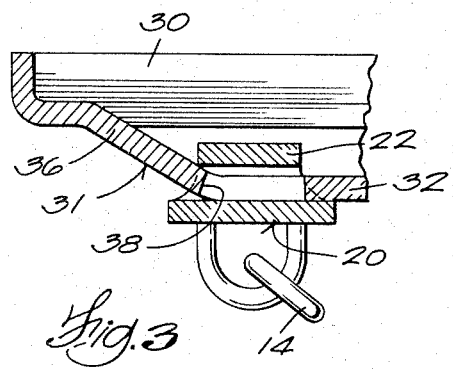
FIG. 3 is a cross-sectional view upon line 3—3 of FIG. 1.
Figure 4:
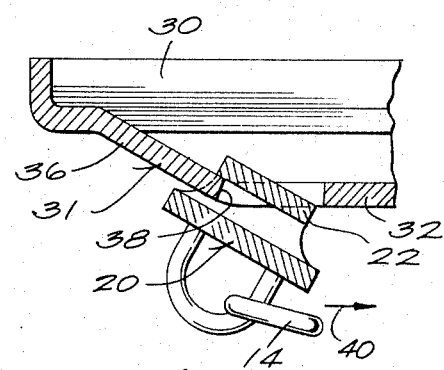
FIG. 4 is a view similar to the view of FIG. 3 with the slide shown in a different position.

Door plate 30 is secured to a door in the conventional manner. The track in this embodiment is a rail 31 which is made of the same piece of metal as door plate 30, being struck upward out of the plane of door plate 30 so that main portion 32 of the rail occupies a separate parallel plane in front of the door plate 30. Rail 31 is provided with an end 34 which is mounted adjacent the door edge. Rail 31 is also provided with an end 36 remote from the edge of the door. Rail 31 is full width from end 34 at which it merges with the main portion of door plate 30 through most of section 32. The termination of end portion 36 merges with base plate 30 as does that of end 34. At the point where central portion 32 of rail 31 meets end portion 36, notches 38 are provided in the top and bottom of the rail 31 to a depth equivalent to the width of flanges 22 forming a narrow rail section 39 meeting end 36 and comparable in width to the space between flanges 22. The length of notches 28 is less than the length of flanges 22 as best shown in FIG. 3 and FIG. 4.

Because of this construction, as slide 20 is slid to the left as viewed in these drawings, it cannot be removed from the rail at any point. Flanges 22 grip rail 31 too tightly to permit it to be turned enough to pass through notches 38 for removal. Accordingly slide 20 passes all the way to the end 36 of the rail, at which point it is stopped by contact with door anchorage plate 30. Thus a person seeking entry to the door protected by my device can attach his rubber band and secure it to the door and can force the slide 20 to move all the way to the left, but the slide 20 will remain securely on rail 31. When he re-opens the door expecting the chain to be loose, chain 14 will pull slide 20 to the right along rail 31 in the direction of jamb plate 10 as the door opens. Because the angle of pull is toward jamb plate 10, the slide 20 will not pass through notches 38 and come off the rail, but will follow the central portion of the rail 32 and will travel to end 34, at which point it will be again stopped by contact with door plate 30 with the door firmly secured against further opening. Because both ends of rail 31 are made in one piece with door plate 30 of heavy, strong metal, additional pressure against the door will not break rail 31 free of door 30 or otherwise permit slide 20 to come off.

When the person on the inside of the door wishes to open the door, it is easy, with the door closed, to move slide 20 to portion 36 of the rail, at which time the slide is inclined to the same angle with respect to the door plate as portion 36 of the rail. Flanges 22 may then exit endwise through notches 38 moving along angled end portion 36 by moving slide 20 to the right and toward the user. On the other hand, a person outside pushing the door applies force along the taut chain 14. Such a force pivots slide 20 to follow central portion 32 of rail 31 rather than permitting it to exit endwise from rail 31 by way of notches or slots 38 and narrow rail portion 39.

Figure 5:
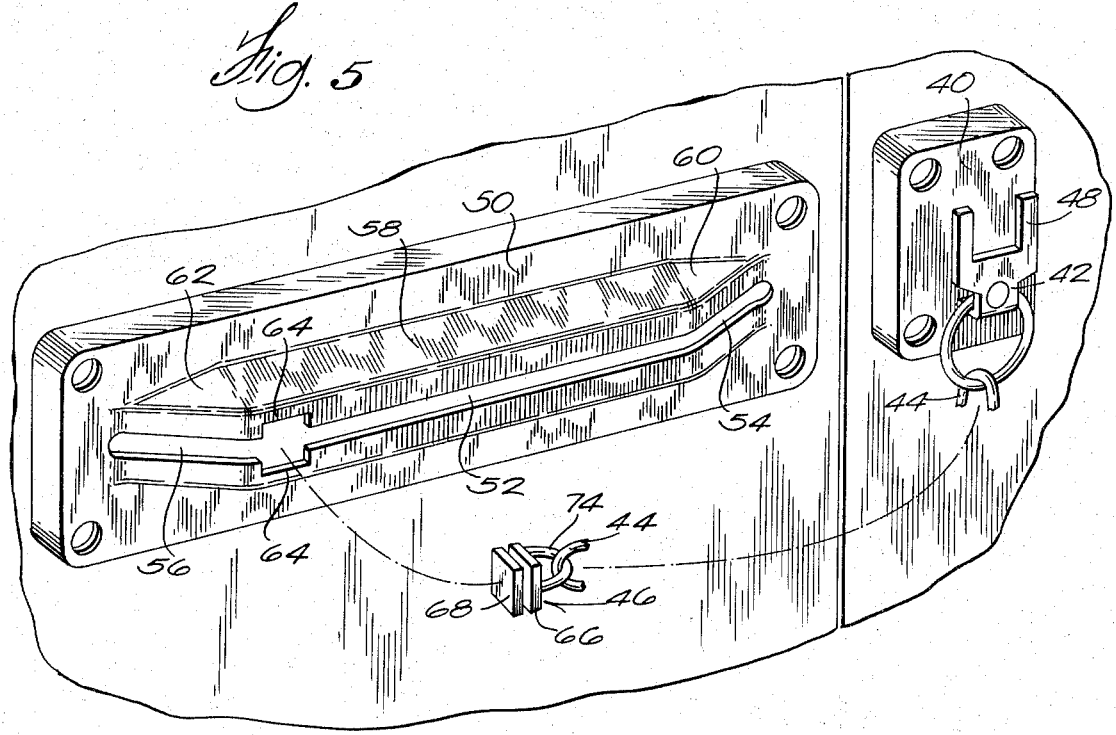
FIG. 5 is a front perspective view of a second embodiment of the invention.
Figure 6:
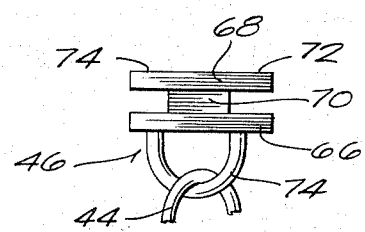
FIG. 6 is a detail view of the slide for the embodiment shown in FIG. 5.

FIGS. 5 and 6 disclose a second embodiment of the invention in which the track is a slot rather than a rail. The notched portion of the track accordingly extends outwardly from the sides of the slot instead of extending inwardly from the sides of a rail 31. This embodiment includes a jamb plate 40 having an anchorage 42 for a security chain 44. Jamb plate 40 is attached to the jamb in any conventional way. A slide 46 is attached to the end of security chain 44 and is shaped to slidingly engage the edges of a slot to be described hereinafter. A slotted bracket 48 is attached to anchorage 42 and projects upwardly therefrom for storing slide 46 when it is not in use.

A door plate 50 is attached to the door in any conventional manner adjacent to the jamb plate 10. Door plate 50 has a slot therein comprising a central section 52, which is displaced outwardly from the plane of door plate 50 and extends parallel thereto, a jamb end section 54, which extends at an angle between the jamb end of central section 52 and door plate 50, and a remote end section 56, which extends at an angle between the remote end of central section 52 and door plate 50. The edges of slot sections 52, 54 and 56 and the door plate 50 are formed from the same piece of metal, the slot being formed in the material of door plate 50, and the edges of the slot being struck upwardly out of the plane of door plate 50 so that the central slot section 52 occupies a separate parallel plane in front of the door plate 50. The metal which defines the edges of the slot is bent over a short distance from the slot and forms a mound having a substantially flat central section 58 and two downwardly angled end portions 60 and 62 which correspond respectively to angled slot sections 54 and 56.

Outwardly extending notches 64 are provided in the end of central slot section 52 which is remote from the jamb end of the slot. The notches 64 are positioned adjacent to the inner end of angled slot section 56 so that the slide 46 can be inserted into the notches 64 at an angle as will be described hereinafter.

The slide 46 is made up of an outer plate 66 and an inner plate 68 which are held together in spaced parallel relationship by being attached to opposite sides of a central section 70. The central section 70 is smaller in width than the slots 52, 54 and 56 so as to be slideable therewithin, and the inner plate 68 has side edges 72 and 74 which extend outwardly beyond the central section 70 to form outwardly directed flanges. A metal loop 74 for receiving the security chain 44 is permanently attached to outer plate 66 by any suitable means. The distance between the outer side margins of the flanges 72 and 74 is smaller than the distance between the top and bottom edges of notches 64 but larger than the distance between the edges of slots 52, 54 and 56. The central section 70 is thicker than the metal at the edges of the slots. These dimensional relationships allow the slide 46 to be inserted edgewise into the notched portion 64 to slot 56, and slide along the slots 52, 54 and 56, with the flanges 72 and 74 being engaged by the inner surface of the metal defining the slots and the edges of outer plate 66 being engaged by the outer surface of the metal defining the slots. In this manner the slide 46 embraces the sides of the slots to provide a secure sliding connection for the end of security chain 44.

The length of the notched portions 64 parallel to the axis of the slot 52 is enough shorter than the corresponding dimension of the slide flanges 72 and 74 so that the slide flanges cannot be passed through the notches 64 except by being tilted and slid along the angled slot portion 56 and then returned edgewise through notches 64. This corresponds to the condition illustrated for the first embodiment in FIGS. 3 and 4 wherein the notched portion 38 of the previously described embodiment is shorter than the flanges 22 and thereby requires that the slide 20 be tilted as shown in FIG. 4 to be passed edgewise through the notches 38. There is no difference in principle between the two embodiments; in both cases, the track is notched to admit the slide, and the flanges of the slide are slightly longer than the notch so as to require the slide to be tilted to pass through the notch edgewise. The fact that the track is a rail in one case and a slot in the other, and that the notch is oriented inward in one case and outward in the other, does not alter the principle involved.

In order to withdraw the slide 46 through the notched portion 64, the slide must not only be tilted but also be acted on by a force component that extends toward the jamb in the plane of the angled slot 56. If the force applied to the slide extends in any other direction, the slide will move from slot 52 to 56, or vice versa, being engaged by one slot before disengaging from the other. Thus, the slide 46 cannot be disengaged from the slot by the force developed by a rubber band attached between the slide and the inner surface of the door. Such a force would be directed slightly inwardly at the notch 64 and would only serve to move the slide 46 into angled slot 56 where it would come to rest against the closed end of the slot. When the door was subsequently opened, the direction of the force applied by the security chain 44 would also be directed slightly inwardly at the notch 64 and would cause the slide 46 to move from angled slot 56 into parallel slot 52. Continued force from the security chain 44 would ultimately wedge the slide 46 against the end of angled slot 54, where it would prevent the door from being opened any further than the small crack permitted by the length of security chain 44. The slide 46 can, however, be easily removed from the inside of the door by sliding it to the notch 64, tilting it at the angle of slot 56, and then moving it along the same angle out of the notch.

It will thus be seen that I have provided a door safety chain which is unusually secure against housebreakers, both because of its shape and because of its construction of a single piece of metal for forming both the door plate and the track. Such construction is very strong and also gives manufacturing advantages because it is not necessary to fabricate a separate track and secure it to the door plate. The latter structure costs more and is likely to be weaker.

While the above description is detailed and exact, it is intended for exemplification rather than limitation. The scope of my invention is defined in the following claims.

I claim:

1. In a door security chain having a jamb plate and a door plate, a security chain secured to the jamb plate and a slide secured to the other end of the security chain, the improvement comprising a track on which said slide is slideable, said track including a center section substantially parallel to the door plate and two angled ends, a jamb end and a remote end, said ends being respectively secured to the door plate, said slide having flanges engaging said track and having spaced margins shaped to secure said slide to the inner side of said track in operative position, said slide being slideable along said track to a position of engagement with the door plate at each end without removal, the center section of said track remote from the jamb end of said track and adjacent said remote end section being provided with a notched portion, said margins of the flanges of said slide being spaced apart a width which permits them to pass through said notched portion, and said flanges being longer than said notched portion whereby said slide must be angled in order to pass said flanges edge first through said notched portion.

2. The device of claim 1 wherein said track comprises a rail and wherein said notched portion of said track comprises a pair of matching notches which extend inwardly from opposing edges of said track to form a narrowed portion thereof.

3. The device of claim 2 wherein said flanges are directed inwardly with respect to said rail and wherein said flanges are spaced apart at their margins by a width which is smaller than the width of said rail but which is at least equal to the width of the narrowed portion of said rail.

4. The device of claim 1 wherein said track comprises a slot and wherein said notched portion of said track comprises a pair of matching notches which extend outwardly from opposing edges of said track to form an enlarged portion thereof.

5. The device of claim 4 wherein said flanges are directed outwardly with respect to said slot and wherein said flanges are spaced apart at their margins by a width which is greater than the width of said slot but which is no greater than the width of said enlarged portion of said slot.

6. The device of claim 1 in which the track and the door plate are formed from a single piece of material.

* * * * *